US00RE37553E

(19) United States
(12) Reissued Patent
Ciavarini et al.

(10) Patent Number: US RE37,553 E
(45) Date of Reissued Patent: Feb. 19, 2002

(54) BUBBLE DETECTION AND RECOVERY IN A LIQUID PUMPING SYSTEM

(75) Inventors: Steven J. Ciavarini, Bellingham; Robert J. Dumas, Upton, both of MA (US)

(73) Assignee: Waters Investments Limited

(21) Appl. No.: 09/248,327

(22) Filed: Feb. 9, 1999

Related U.S. Patent Documents

Reissue of:
(64) Patent No.: 5,823,747
Issued: Oct. 20, 1998
Appl. No.: 08/654,759
Filed: May 29, 1996

(51) Int. Cl.[7] ..... B01D 15/08
(52) U.S. Cl. ..... 417/216; 210/101
(58) Field of Search ..... 210/101, 198.2, 210/656; 417/2, 216, 244, 254

(56) References Cited

U.S. PATENT DOCUMENTS 4,117,727 A * 10/1978 Friswell et al. ..... 73/422 GC
4,681,678 A * 7/1987 Leaseburge et al. ..... 210/101
4,883,409 A * 11/1989 Strohmeier et al. ..... 417/43
5,071,562 A * 12/1991 Allington et al. ..... 210/101
5,158,675 A * 10/1992 Allington et al. ..... 210/101
5,360,320 A * 11/1994 Jameson et al. ..... 210/101
5,393,420 A * 2/1995 Hutchins et al. ..... 210/101
5,393,434 A * 2/1995 Hutchins et al. ..... 210/656
5,450,743 A * 9/1995 Buote ..... 73/61.56
5,507,624 A * 4/1996 Fehn ..... 417/53

* cited by examiner

*Primary Examiner*—Ted Kim
(74) *Attorney, Agent, or Firm*—Brian L. Michaelis

(57) ABSTRACT

A serial, dual piston high pressure fluid pumping system that overcomes the difficulties of gas in the fluid stream without the need for added mechanical valves or fluid paths. A bubble detection and recovery mechanism monitors compression and decompression volumes of the serially configured dual pump head pump, and the overall system delivery pressure. Bubble detection is effected by sensing a ratio of compression to decompression volume and determining if the ratio exceeds an empirical threshold that suggests the ratio of gas-to-liquid content of eluent or fluid in the system is beyond the pump's ability to accurately meter a solvent mixture. The magnitude of the ratio of compression to decompression volume indicates that either the intake stroke has a bubble or that the eluent has a higher-than-normal gas content. Once a bubble has been detected, recovery is effected by forcing the pump into a very high stroke volume with the compression and decompression stroke limits constrained to obtain the largest delivery stroke compression ratio that will expel a bubble or solvent that has detrimental quantities of gas.

17 Claims, 3 Drawing Sheets

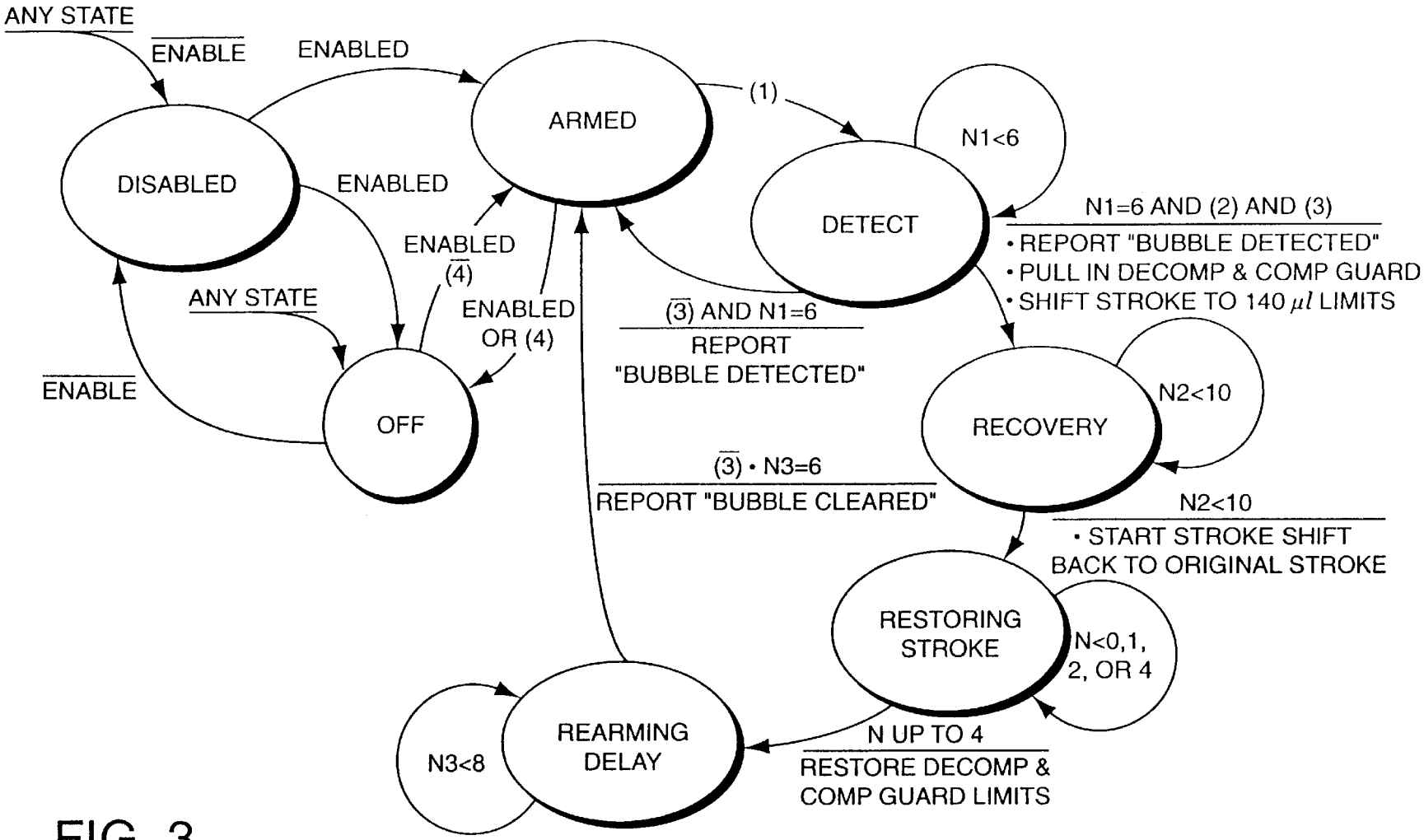
FIG. 3
AMENDED

BUBBLE DETECTION AND RECOVERY IN A LIQUID PUMPING SYSTEM

Matter enclosed in heavy brackets [ ] appears in the original patent but forms no part of this reissue specification; matter printed in italics indicates the additions made by reissue.

FIELD OF THE INVENTION

The present invention relates to liquid pumps, and more particularly to a method and apparatus for detecting and recovering from gas bubbles in a liquid stream being pumped by the liquid pump.

BACKGROUND OF THE INVENTION

High-pressure pumping systems are known for delivering liquid at high pressure. Such a system is described in U.S. Pat. No. 4,883,409 ("the '409 patent"). The '409 patent describes a pumping apparatus for delivering liquid at a high pressure, such as for high performance liquid chromatography ("HPLC") applications. The pumping apparatus comprises two pistons which reciprocate in respective pump chambers. The pistons and pump chambers are connected "serially" in that the output of the first pump chamber is connected via a valve to the input of the second pump chamber. The pistons are driven by linear drives, e.g., ball-screw spindles, and are synchronized so that a first or primary pump head receives its fluid intake at atmospheric or ambient pressure and compresses the intake, or puts it under pressure to a point, just prior to delivering the fluid to the second or accumulator pump head which has a high pressure interconnection with the primary pump head and virtually always receives pressurized fluid.

In the apparatus of the '490 patent, the stroke volume displaced by the respective piston is freely adjustable during a controlled stroke cycle. Control circuitry is operative to reduce stroke volume at reduced flow rates, leading to reduced pulsations in the outflow of the pumping apparatus. According to the '409 patent, the pumping system includes a control means and mechanisms to vary stroke length or volume, and stroke frequency. The control means is operative to adjust the stroke lengths of the pistons between their top dead center and their bottom dead center, respectively, permitting an adjustment of the amounts of liquid displaced by the first and second piston, respectively, during a pump cycle such that pulsations in the flow of the liquid delivered to the output of the pumping apparatus are reduced.

While pulsations at the output are reduced according to the '409 patent, no consideration is given to the presence of gas in the liquid stream. It is acknowledged in the '409 patent that the compressibility of solvents used in HPLC can be problematic, presenting a source of output flow pulsations. However, there is no consideration of the affects of gas in the solvent(s), and the negative implications that gas, i.e. in the form of bubbles, will on the output of the pumping system and ultimately on the reliability of the chromatograph.

At least one system known in the art identifies problems and includes mechanisms that attempt to address the problems associated with gas in the liquid stream. U.S. Pat. No. 5,393,343 ("the '434 patent") discloses that gas liberated due to reduced pressures during the inlet phase of operation of a pressurized pumping system can accumulate in the pumping chamber and will not be expelled through the outlet because of the back pressure present. Consequently, the pump will stop pumping liquid when the trapped gas remains in the system. Other problems are produced by typical hard seat check valves which can be propped open by particulate matter causing leaks. Also, ordinary inlet valves in known systems are opened on an inlet stroke by suction, which contributes to undesirable as generation from the liquid being pumped.

According to the '434 patent, a liquid chromatography system is disclosed including a liquid pump having a pumping chamber, an inlet port, an outlet port, and a purge port, all communicating with the pumping chamber. A purge valve is connected to the purge port and is used to purge gas from the system. A disclosed method of operation of the system includes monitoring the pumping performance of the liquid pump to detect the presence of air in the pumping chamber; opening the purge valve; and producing a forward stroke of the piston to discharge the detected air through the purge valve. It is asserted in the '434 patent that of the pumping chamber will quickly correct faulty pump performance resulting from air trapped in the liquid phase. The pumping performance is monitored by monitoring the pressure in the pumping chamber, as it is asserted that pumping chamber pressure can indicate the presence of trapped air.

In the parallel, dual pumping implementation of the '434 patent, each liquid pump has a pumping chamber, an inlet valve for receiving liquid, an outlet valve for discharging liquid to a separation column, a piston for drawing liquid through the inlet valve during a backstroke and for discharging liquid through the outlet valve during a forward stroke, and a pressure sensor for sensing the pressure in the pumping chamber. The method of operating such an apparatus involves monitoring the pressure in the pumping chamber with the pressure sensor during the forward stroke of the piston to detect the presence of air in the pumping chamber; determining the deficiency in liquid flow produced by the pump because of the detected air in the pumping chamber; and adjusting the operation of the pump to compensate for the deficiency.

Adjusting pump operation effects desired pump performance by compensating the length of the pump's forward stroke. The adjusting step may include adjusting the speed of the forward stroke of the piston, or adjusting the speed of the backstroke of the piston. In order to effect such a method, the monitoring is performed during an early portion of the forward stroke. Early monitoring facilitates the desired adjustment of pump operation.

In the dual, parallel pump configuration of the '434 patent, monitoring is effected with a first pressure sensor which monitors the pressure in the first pumping chamber to detect an end of the forward stroke by the first piston. Forward stroke of the second piston is initiated in response to the monitoring of the pressure in the first pumping chamber. A second pressure sensor senses the pressure in the second pumping chamber to detect an end of the forward stroke by the second piston. The forward stroke of the first piston follows in response to the sensing of the pressure in the second pumping chamber. Accordingly, controlled parallel pump operation is effected.

Uniform system pressure in the parallel implementation is effected by determining system pressure in the separation system and accordingly initiating the forward stroke of the first piston to provide the system pressure in the first pumping chamber at the end of the forward stroke by the second piston. The forward stroke of the second piston is initiated, at the end of the forward stroke of the first piston, to provide the system pressure in the second pumping chamber. The forward stroke of the second piston is initiated at the end of the forward stroke of the first piston, and the forward stroke of the first piston is initiated at the end of the forward stroke of the second piston. This synchronizes operation of the parallel pump.

Parallel pumps, such as disclosed in the '434 patent have inherent disadvantages. Parallel pump configurations, which by definition alternate delivery between pump heads, tend to have higher levels of unswept volumes. Dead or unswept volumes remain undelivered, and during gradient operation the unswept volume is delivered out of order, i.e. after delivery of the alternate pump head volume, resulting in compositional ripple and/or inaccurate chromatographic peaks.

Furthermore, the mechanism effected in the '343 patent disadvantageously includes a spring loaded outlet check valve which requires additional mechanical parts to address problems associated with gas in the liquid stream. The outlet check valve prevents fluid passage from the pump outlet to a pulse dampener when gas is trapped in the pump chamber (s). To prevent fluid flow from stopping altogether, a separate purge valve is activated to facilitate escape of the gas. When a large drop is pressure is sensed by the pressure transducers, it is assumed that there is gas in the pump chamber. At the onset of the pressure drop, the purge valve is opened, i.e. turned on, and the gas bubble is expelled. No record is maintained of the expulsion of the gas and there is no mechanism to cross-check gas expulsion against particular chromatographic runs to flag potentially erroneous runs. A fairly high degree of solvent conditioning at the input is required to avoid excessive opening of the check valves which can have a detrimental impact on efficacy of the system. Moreover, the '434 patent parallel design requires two additional check valves and two additional purge valves, with each being comprised of six or more additional moving parts. These parts represent additional cost. Long term performance and reliability of all of these additional parts is difficult to maintain.

In addition to the fact that the added mechanisms, in the form of the check valves and purge valves, represent unnecessary mechanical complexity and cost in the system according to the '434 patent, the check valves, as discussed in the '434 patent, present an opportunity for gas to enter the system and/or for leaks to develop. Failure of the mechanical check valves to expel gas from the system can result in the loss of prime of the pumps which will shut the system down. The purge valve and inlet check valve have unswept volumes or flow areas which will disadvantageously contribute to band spreading or broadening of chromatographic peaks. The increased volume in the pump heads due to check valves and purge valves leads to lower compression ratios for pumps according to the '434 patent design, which increases the difficulty in expelling bubbles.

SUMMARY OF THE INVENTION

The present invention provides a serial, dual piston high pressure fluid pumping system that overcomes the difficulties of gas in the fluid stream without the need for added mechanical valves or fluid paths.

According to the invention, a bubble detection and recovery mechanism monitors compression and decompression volumes, and overall system delivery pressure of a serially configured dual pump head pump. Bubble detection is effected by sensing a ratio of compression to decompression volume and determining if the ratio exceeds an empirical threshold that suggests the ratio of gas-to-liquid content of eluent or fluid in the system is beyond the pump's ability to accurately meter a solvent mixture. The magnitude of the ratio of compression to decompression volume indicates that either the intake stroke has a bubble or that the eluent has a higher-than-normal gas content. Once a bubble has been detected, recovery is effected by forcing the pump into a very high stroke volume with the compression and decompression stroke limits constrained to obtain the largest delivery stroke compression ratio that will expel a bubble or solvent that has detrimental quantities of gas.

Features of the invention include provision of a solvent delivery system for HPLC which can automatically recover from a potential loss of prime during many hours of unattended chromatography runs of hundreds of injections. The detection of a bubble can be logged and recorded during each HPLC injection run, to provide a cross-check mechanism to notify the user that chromatography in a given run may be impaired. If the magnitude of a bubble or the degree of gas absorption by the solvent is not too severe, then automatic recovery can maintain acceptable chromatographic results under most typical and adverse external influences of solvent conditioning. Thus solvent conditioning at the input may be minimized. Initial detection of bubbles or gas is qualified using system delivery pressure to substantially prevent false triggering of the recovery sequence whenever the pump is delivering flow in a non-chromatographic context, e.g. during purging of the system. User defined flow rates and solvent composition settings are not affected by the recovery sequence. The design according to the invention avoids the use of spring-loaded check or other mechanical valves, and as such, does not additionally require a purge valve to pass bubbles. Reliability and maintainability of the system is enhanced accordingly. Bubble detection according to the invention permits operation at short piston stroke lengths which minimizes delay volume and compositional ripple with low gas compression ratios. The bubble detection desensitizes operational sensitivity to low gas compression ratios.

DESCRIPTION OF THE DRAWINGS

These and other features and advantages of the present invention will become more apparent in light of the following detailed description of an illustrative embodiment thereof, as illustrated in the accompanying drawings of which:

FIG. 3 is a state transition diagram of the bubble detection and recovery mechanism of FIGS. 1 and 2.

DETAILED DESCRIPTION

A bubble detection and recovery mechanism according to the invention detects the pressure of a bubble or significant amounts of gas in a fluid stream and performs a recovery sequence to enhance the pump's ability to expel a bubble or solvent/fluid stream having a significant gas content. The bubble detection and recovery mechanism is implemented in a solvent delivery pump system, such as is typical in High Pressure Liquid Chromatography (HPLC) applications. Upon detection of a bubble or significant amounts of gas in the fluid stream, a recovery sequence is performed without disturbing user-set flow rates and solvent composition settings.

Figure 1:
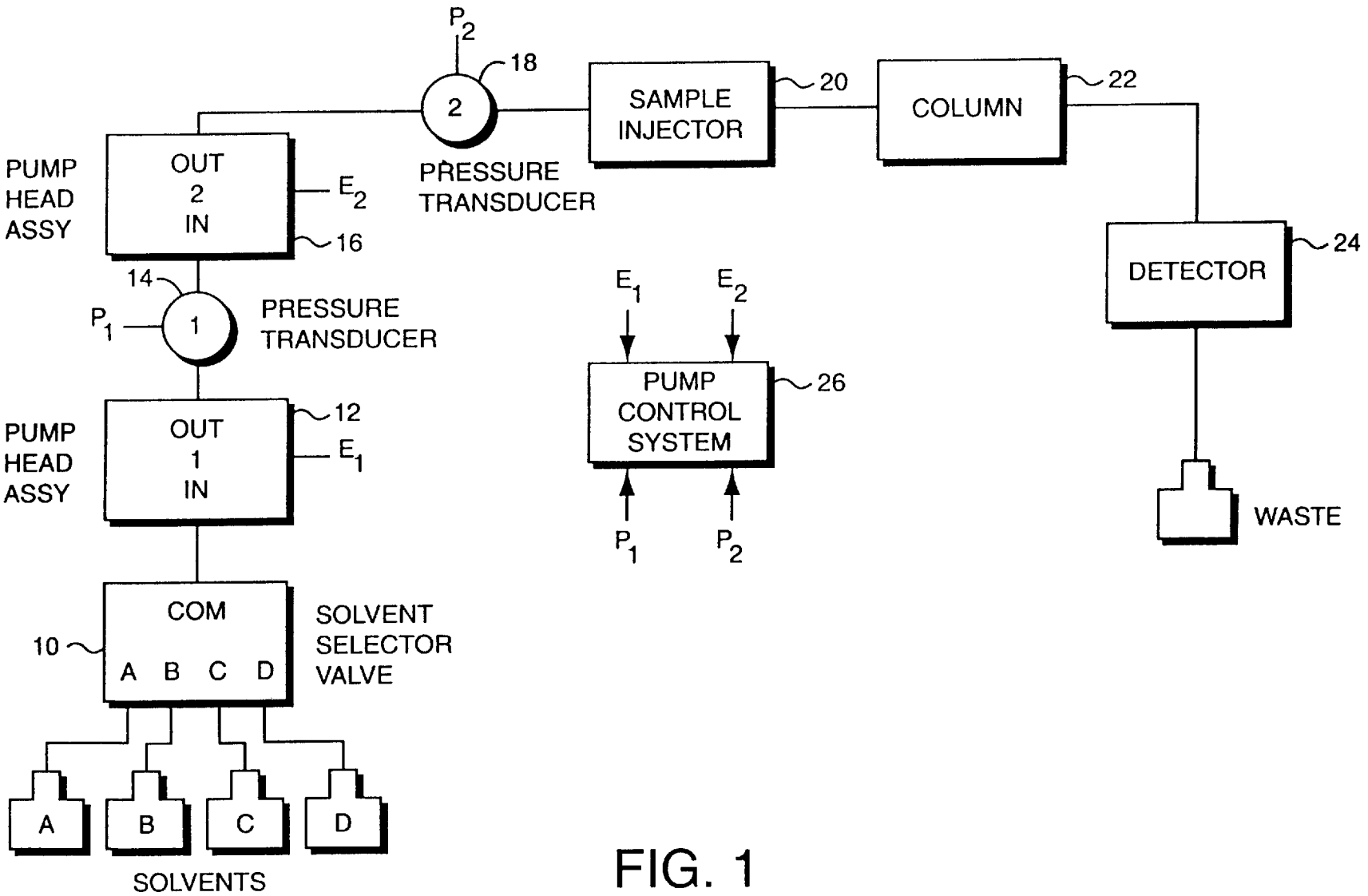
FIG. 1 is a block diagram of a serial dual pump system according to the invention.

The apparatus in which the bubble detection and recovery mechanism is implemented, is a solvent delivery pump system, such as illustrated in FIG. 1, designed to meter multiple solvents and deliver a desired mixture at a desired flow rate for the purpose of performing chromatography separations of sample compounds.

As illustrated, solvent mixing is performed on a low-pressure inlet side of the pump. Up to four different eluents (i.e. solvents) A, B, C, D, are available for mixing in selected compositions, as known in the art, using a known solvent selector valve 10. The solvent selector valve 10 performs low pressure mixing of the solvents A, B, C, D, in any combination of the four eluents at atmospheric pressure. The outlet of the solvent selector valve 10 is connected to a pump head assembly 12 of a primary pump, which as receives the mixed composition of solvents at ambient pressure and effects initial pressurization of the fluids input to the system.

The primary pump head 12 in this illustrative embodiment (and likewise an accumulator pump head as discussed hereinafter) is a pump head that has features as described in U.S. patent application Ser. No. 08/606,149 filed Feb. 23, 1996, which is incorporated herein by reference. The pump head 12 is generally comprised of a piston configured to reciprocate in a piston chamber, an inlet check valve, and a motor and drive mechanism (none of which are shown in FIG. 1). The pump heads are also configured with a motor shaft encoder that ultimately provides measurement of the position of the reciprocating plunger with respect to a reference and outputs a signal indicative of the same. The primary pump head 12 is the low pressure side of the pump, because its intake is at atmospheric pressure during the pump cycle. The primary pump head 12 is used to pressurize the solvent input and bring it up to the desired system pressure. A pressure transducer 14 is used at the output of the primary pump head 12 to determine the pressure of fluid output.

The primary pump head 12 works in conjuction with an accumulator pump head 16 to effect a serial, dual piston pump implementation. During primary intake, the accumulator pump head is maintaining system delivery, delivering solvent at system pressure. The primary pump head 12 is also brought up to system pressure just prior to it delivering fluid to the system via the accumulator pump head 16, by driving towards top dead center up to a maximum percentage of the working stroke, referred to as a precompression limit or constraint. During primary delivery the accumulator is receiving and storing fluid for the next delivery cycle. As described hereinbefore, the outlet of the primary pump head 12 is connected to the pressure transducer 14, and the outlet of the pressure transducer 14 is connected to the accumulator pump head 16, which is the high pressure side of the pump. During normal operation the high pressure side of the pump should never drop below system pressure. The outlet of the accumulator pump head 16 is connected to a second pressure transducer 18 which registers system delivery pressure. The outlet of the transducer is connected to the sampler/injector 20 which is in turn connected to a separation column 22 and detector 24, as would be understood by those skilled in the art.

A pump control system 26 receives encoder signals E1, E2 and pressure signals P1, P2 and converts them into meaningful information used for control and bubble detection. The pump control system comprises a microprocessor based system and a digital signal processor, which collaboratively perform the functions of flow and composition control, and motion control respectively, detailed description of which is beyond the scope of the present disclosure.

Figure 2:
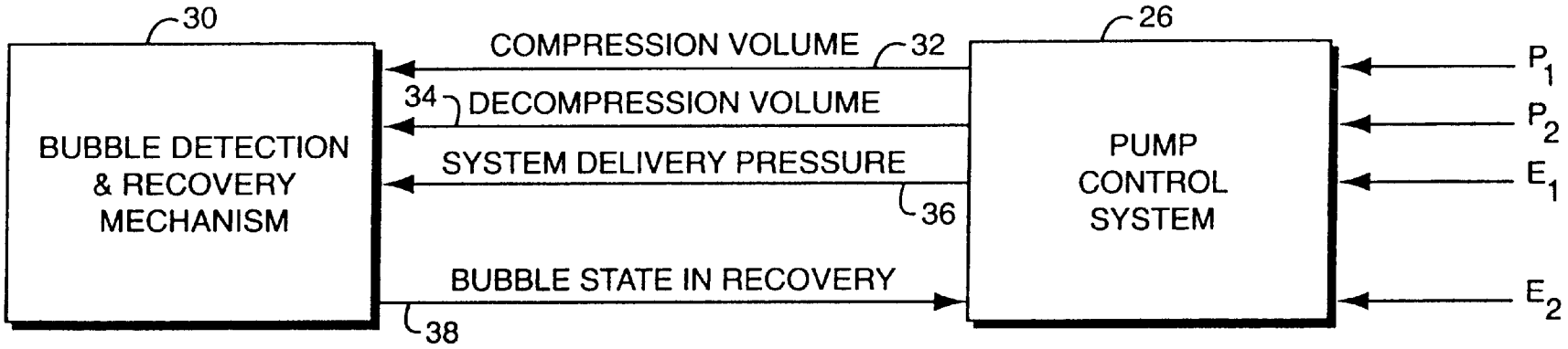
FIG. 2 is a block diagram of a bubble detection and recovery mechanism as it relates to a pump controller in the context of the serial dual pump system of FIG. 1.

As illustrated in FIG. 2, the pump control system 26 uses the encoder signals E1, E2 and the pressure signal P1, P2, to generate a compression volume signal 32 and decompression volume signal 34 and a system delivery pressure signal 36. Each pump cycle, the pump control system 26 makes available to the bubble detection and recovery mechanism, compression volume 32, decompression volume 34 and system delivery pressure 36 obtained via the pressure transducer 18. The pump control system determines the amount of decompression volume [32] *34* by monitoring the pressure transducer 14 and the encoder signal E1 during the intake stroke. The decompression volume is obtained by noting the plunger position at which the signal from the pressure transducer 14 reaches a value that represents atmospheric pressure. The pump control system determines the amount of compression volume 32 by monitoring the signal from the pressure transducer 14 and encoder signal E1 during the precompression stroke, prior to delivering to the accumulator pump head 16. The compression volume is obtained by noting the amount of plunger travel, from the encoder signal E1, that it takes for the signal from the pressure transducer 14 to reach the equivalent value of the signal from the second pressure transducer 18, which is the system delivery pressure 36. The compression and decompression volume signals 32, 34 and system delivery pressure signal 36 are issued to the bubble detection and recovery mechanism 30 according to the invention.

The bubble detection and recovery mechanism is generally a state machine that operates in tandem with the pump control system which, as generally understood in the art, controls both the pump's flow delivery and fluid composition. The bubble detection and recovery mechanism 30 provides its state value 38 to the pump controller 26. The system controller 26 monitors the state value and only initiates a bubble recovery stroke when it sees the state in Recovery mode. Although working in tandem in certain instances described hereinafter, the pump control system 26 and the bubble detection and recovery mechanism 30 operate independently of one another.

A state transition diagram of the bubble detection and recovery mechanism is illustrated in FIG. 3. The state transition diagram represents the internal behavior of the bubble detection and recovery mechanism 30. Generally, a compression to decompression volume ratio parameter trips or enables bubble detection when the ratio exceeds an empirically derived threshold. The ratio of compression to decompression volume exceeding an empirical threshold indicates that the ratio of gas-to-liquid content of the eluent is beyond the pump's ability to accurately meter a solvent mixture. The extent to which the ratio exceeds a predetermined ratio suggests that either the intake stroke has a bubble or that the eluent has a higher-than-normal gas content.

Once the bubble has been detected, i.e. the threshold exceeded, the mechanism 30, generally, causes the pump control system to control the pump heads to deliver maximum stroke at the onset of detecting a bubble, thereby effecting sufficient stroke to generate high gas compression ratios. The high compression ratios generated cause the bubble to go into the solution as the fluid is passed from the low pressure to the high pressure side of the pump. The bubble detection mechanism 30 will cause the larger stroke to be effected until such time as a selected or proper compression to decompression volume ratio is once again achieved, i.e. once the gas bubble or high gas content solvent is passed through the system. The very high stroke volume is implemented with compression and decompression stroke limits constrained to obtain the largest delivery stroke compression ratio required to expel a bubble or solvent that has absorbed a lot of gas.

Referring now to FIG. 3, the state machine implementing the bubble detection and recovery mechanism 30 according to the invention includes the following states:

Disabled-the mechanism can be deactivated at any time, on command, by asserting the Disabled. The default is to have the mechanism enabled in which case it can be in any of the following six states.

Off-the mechanism is automatically defeated during certain restrictive modes of the pump in which the compression and decompression volume information is not available; e.g., while flow rate is being changed and whenever the pump is operating in a flow regime not used for chromatography, such as during purging of the system or the like.

Armed-this is the typical state in which the mechanism remains idle while it waits to detect a bubble.

Detect-is the state used to qualify the presence of a bubble before performing the automatic recovery sequence. Its purpose is to minimize the sensitivity of the mechanism from momentary upsets of either compression or decompression volumes and/or system pressure transients that would otherwise lead to a false bubble detection.

Recovery-is the state in which the pump control system alters the pump stroke and compression/decompression constraints to achieve the desired high compression ratio.

Restoring Stroke-is a wait state in which the bubble mechanism delays until the pump control system restores the pump back to its original stroke volume.

Rearming Delay-is a wait state in which the bubble mechanism delays before re-arming for another bubble detect event. It allows the pump sufficient time to stabilize before accepting new compression/decompression ratio values for the next bubble detect event.

Referring to FIGS. 2 and 3, the pump control system monitors the state of the bubble mechanism while maintaining the desired flow rate and solvent composition settings and only modifies its behavior whenever it sees the bubble mechanism in the state Recovery. If the magnitude of a bubble or the degree of gas adsorption by the solvent is not too severe, then automatic recovery, as described, can maintain acceptable chromatographic results under the most typical and adverse external influences of solvent conditioning. In all other states, the pump control system maintains the preset working stroke parameters.

As illustrated in the state transition diagram of FIG. 3, the bubble mechanism, once enabled, remains idle in its Armed state while it monitors for the presence of a bubble. While in the Armed state, the bubble mechanism monitors the compression and decompression volumes obtained each pump cycle from the pump control system. If the ratio of compression-to-decompression volumes exceeds an empirically-derived threshold limit $R_1$ (in this illustrative embodiment the limit is approximately 1.0–2.0), and the system delivery pressure exceeds a preset minimum threshold $P_1$ (in this embodiment approximately 650 psi), then the mechanism transitions to the Detect state. The system delivery pressure is used as a qualifier to prevent false triggering of the recovery sequence whenever the pump is delivering flow in a non-chromatographic context; e.g., purging the system.

Once triggered into the Detect state, the mechanism blindly delays for a preset number of $N_1$ pump cycles (approximately equal to 6) to ensure that the bubble is sufficiently large to warrant a recovery sequence. At the end of $N_1$ pump cycles, the ratio of compression-to-decompression volumes is checked a second time. If the threshold $R_1$ is found to be violated or exceeded, then the mechanism considers a bubble as being detected, otherwise the bubble is considered too small in magnitude and the mechanism transitions back to the Armed state. It should be noted that the pressure threshold of $P_1$ is not used to qualify the second violation of $R_1$, in case the magnitude of the bubble is sufficiently large to have collapsed system delivery pressure. This ensures that bubble recovery will be performed to avoid a loss of prime condition. Thus, the solvent delivery system can automatically recover from a potential loss of prime during many hours of unattended chromatography runs of hundreds of injections.

The action taken on egress from the Detect state when the mechanism has declared a detected bubble is contingent on a user-configurable system-level option for bubble detect. The user may elect to either ignore, log only, or log and recover. If the option is configured to ignore, then the mechanism returns back to the Armed state. If the option is configured to log only, then a bubble detect message is logged to alert the user that the chromatogram may have been affected, before returning to the Armed state. If the option is configured to log and recover, then the mechanism logs the bubble detect message and transitions to the Recovery state, which initiates the recovery sequence. Accordingly, the detection of a bubble can be logged and recorded during each HPLC injection run, to notify the user that chromatography may be impaired The bubble mechanism remains in the Recovery state for a fixed duration of a preset number of pump cycles $N_2$ (in this embodiment set to 10) to allow the pump controller a sufficient number of strokes to clear the bubble using the larger bubble recovery stroke. Meanwhile, as soon as the pump controller recognizes that the bubble mechanism has entered the Recovery state, it changes its cycle scheduling at the next intake stroke to use the larger bubble recovery stroke and constrains the amount of stroke travel normally allocated for decompression and pre-compression. These two actions allow the pump to attain a sufficient compression ratio necessary to expel solvent that has absorbed a considerable amount of gas. The pump controller to operate under the bubble recovery stroke parameters until the bubble mechanism transitions out of its Recovery state.

When the preset number of N2 pump cycles expire, the bubble mechanism transitions into the state Restoring Stroke. This state is necessary, because the pump controller can not instantaneously transition between the normal operating stroke and the bubble recovery stroke. Depending on the operational stroke, it can take up to 4 pump cycles (N) while in the Recovery state to shift into the bubble recovery stroke. On entry into the Recovery state, the bubble mechanism keeps track of how many pump cycles it took for the pump controller to shift up to the bubble recovery stroke. It uses this count later to count down in the Restoring Stroke state before it begins its stabilization delay in the Rearming Delay state. The state transition from Restoring Stroke to Rearming Delay is detected by the pump controller as a signal to return back to the normal operating stroke parameters.

The bubble mechanism remains in the Rearming Delay state for a fixed duration of a preset number of pump cycles to allow the pump sufficient time to restabilize. When the number of pump cycles reaches a preset limit $N_3$ (in this embodiment set to 6), the bubble mechanism completes its recovery sequence by returning back to the Armed state. On transition back to the Armed state the compression ratio is checked again as described hereinbefore.

The Off and Disabled states are not part of the detection and recovery sequence. They serve as exception states in which bubble detection and recovery can not be performed.

While the bubble detection and recovery mechanism described herein uses a ratio between the compression volume and decompression volume to detect bubbles, it should be appreciated that the compression volume and decompression volume information can be used as well for other purposes, such as to estimate the volume of gas in a solvent, or the like.

While the use of compression volume and decompression volume information is described herein in the context of a dual pump head serial pump, it should be appreciated that similar use of a compression/decompression volume ratio can be effected in a parallel pump configuration if the pumps are under independent control so that one of the measurements can be obtained from one pump while the other pump is delivering fluid.

Although the bubble detection and recovery mechanism is described generally herein as a state machine, it will be appreciated that the state machine described in detail hereinbefore can be implemented as software running on the pump control system microprocessor, or the state machine cam be implemented in hardware as an application specific integrated circuit, or as a combination of hardware and software elements effecting the states and functionality as described.

While the invention is described herein in an implementation to detect bubbles in the volume domain, i.e. by monitoring trends in compression and decompression volumes during each pump cycle (as opposed to the pressure domain as in prior art implementations), it should be appreciated that measured cycle-to-cycle changes of compression volume could be used for other purposes in a fluid transport system such as disclosed herein, such as for selectively activating the recovery sequence in cases where the magnitude of a bubble or the degree of gas absorption is sufficiently large. Similarly, cycle variations of decompression volumes could be used to track and normalize changes found in compression volumes while compression is under gradient control.

Although the invention has been shown and described with respect to an illustrative embodiment thereof, it should be understood by those skilled in the art that the foregoing and various other changes, additions and omissions in the form and detail thereof may be made without departing from the spirit and scope of the invention as delineated in the claims.

What is claimed is:

1. A method for detecting gas in a fluid transported through a fluid delivery system comprising a first pump head having a first piston actuating in a first direction and a second direction within a first piston chamber and a second pump head having a second piston actuating in a first direction and a second direction within a second piston chamber, said first pump head receiving said fluid and pressuring said fluid to form a pressurized fluid and said second pump head receiving said pressurized fluid from said first pump head, comprising the steps of:

monitoring compression volume of said pressurized fluid compressed by said [second] *first* piston within said [second] *first* piston chamber to determine a compression volume;

monitoring decompression volume of said pressurized fluid within said [second] *first* piston chamber to determine a decompression volume;

determining a compression to decompression volume ratio representing a ratio of said compression volume to said decompression volume;

selecting a threshold level of said ratio of said compression volume to said decompression volume;

determining if said compression to decompression volume ratio exceeds said threshold level;

if said compression to decompression volume ratio exceeds said threshold level increasing a stroke length of *at least* said [second] *first* piston.

2. The method of claim 1 wherein said step of monitoring compression volume includes the steps of:

using a first pressure transducer to sense a pressure of said pressurized fluid output from said first piston chamber during a precompression stroke of said first piston prior to delivering said pressurized fluid to said second pump head;

determining a system pressure with a second pressure transducer that senses pressure of output from said second piston chamber;

determining an amount of travel of said first piston in said first piston chamber required for said pressure of said pressurized fluid output from said first piston chamber to equal said system pressure.

3. The method of claim 2 wherein said amount of travel of said first piston is determined using an encoder.

4. The method of claim 1 wherein said step of monitoring decompression volume includes the steps of, using a first pressure transducer to sense a pressure of said pressurized fluid output from said first piston chamber during an intake stroke of said first piston; and monitoring a position of said first piston during said intake stroke to determine position of said first piston whereat said pressure of said pressurized fluid output from said first piston chamber is substantially equal to atmospheric pressure.

5. The method of claim 1 wherein said compression volume, said decompression volume and said system pressure are input to a state machine.

6. The method of claim 5 wherein said state machine is enabled by a ratio of said compression volume to said decompression volume exceeding a first selected threshold.

7. The method of claim 5 wherein said state machine effects a state wherein a pump control system controls said first pump head and said second pump head to increase stroke length of at least one of said first pump head and said second pump head.

8. The method of claim 7 wherein said stroke length is increased until said ratio of said compression volume to said decompression volume reaches a second selected threshold.

9. A fluid delivery system including an apparatus detecting gas in a fluid transported through said system, comprising:

a first pump head having a first piston actuatable in a first direction and a second direction within a first piston chamber, said first pump head receiving said fluid and pressurizing said fluid to form a pressurized fluid;

a second pump head having a second piston actuatable in a first direction and a second direction within a second piston chamber, said second pump head receiving said pressurized fluid from said first pump head and pumping said pressurized fluid at a system pressure;

a first pressure transducer that senses a first pressure of said pressurized fluid output from said first piston chamber during a precompression stroke of said first piston prior to delivering said pressurized fluid to said second pump head;

a second pressure transducer that senses a second pressure of output from said second piston chamber;

an encoder to provide an indication of an amount of travel of said first piston within said first piston chamber;

a control system monitoring compression volume of said pressurized fluid compressed by said first piston within said first piston chamber to generate a compression volume signal, monitoring decompression volume of said pressurized fluid within said first piston chamber to generate a decompression volume signal, and monitoring said second pressure of output from said second piston chamber; and a bubble detection and recovery mechanism receiving from said control system an indication of said second pressure of output from said second piston chamber, said compression volume signal, and said decompression volume signal, said bubble detection and recovery mechanism affecting a pump control system that controls said first pump head and said second pump head to increase stroke length of at least one of said first pump head and said second pump head.

10. The fluid delivery system of claim 9 wherein said bubble detection and recovery mechanism includes a state machine receiving from said control system an indication of said second pressure of output from said second piston chamber, said compression volume signal, and said decompression volume signal, and said state machine is enabled by a ratio of said compression volume to said decompression volume exceeding a first selected threshold.

11. The fluid delivery system of claim 9 wherein said state machine effects a state wherein said control system controls said first pump head and said second pump head to increase stroke length of [at least one of] at least one of said first pump head and said second pump head.

12. The fluid delivery system of claim [11] *10* wherein said stroke length is increased until said ratio of said compression volume to said decompression volume reaches a second selected threshold.

13. The fluid delivery system of claim 9 wherein a ratio of said compression volume of said decompression volume exceeding a first selected threshold indicates presence of a bubble in said fluid and said state machine includes a detect state used to qualify presence of said bubble before performing an automatic recovery sequence in order to minimize sensitivity of said bubble detection and recovery mechanism from momentary upsets of either compression or decompression volumes.

14. The fluid delivery system of claim 9 wherein a ratio of said compression volume to said decompression volume exceeding a first selected threshold indicates presence of a bubble in said fluid, and wherein said state machine includes a recovery state in which said control system alters pump stroke of said first pump head and said second pump head to achieve a desired high compression ratio.

15. The fluid delivery system of claim 9 wherein a ratio of said compression volume to said decompression volume exceeding a first selected threshold indicates presence of a bubble in said fluid, and wherein said state machine includes an armed state in which said bubble detection and recovery mechanism remains idle while it waits to detect a bubble.

16. The fluid delivery system of claim 9 wherein a ratio of said compression volume to said decompression volume exceeding a first selected threshold indicates presence of a bubble in said fluid, and wherein said state machine includes a restoring state in which said bubble detection and recovery mechanism invokes a delay until said control system restores said first pump head and said second pump head back to an original stroke volume.

17. The fluid delivery system of claim 9 wherein a ratio of said compression volume of said decompression volume exceeding a first selected threshold indicates presence of a bubble in said fluid, and wherein said state machine includes a rearming delay state in which said bubble detection and recovery mechanism delays before re-arming for another bubble detect event to allow said fluid delivery system time to stabilize before accepting new compression volume and decompression volume values for a next bubble detect event.

* * * * *